W. F. HIRSCHMAN.
APPARATUS FOR LOADING AND UNLOADING BAKE OVENS.
APPLICATION FILED FEB. 4, 1916.
1,283,185.
Patented Oct. 29, 1918.
5 SHEETS—SHEET 1.
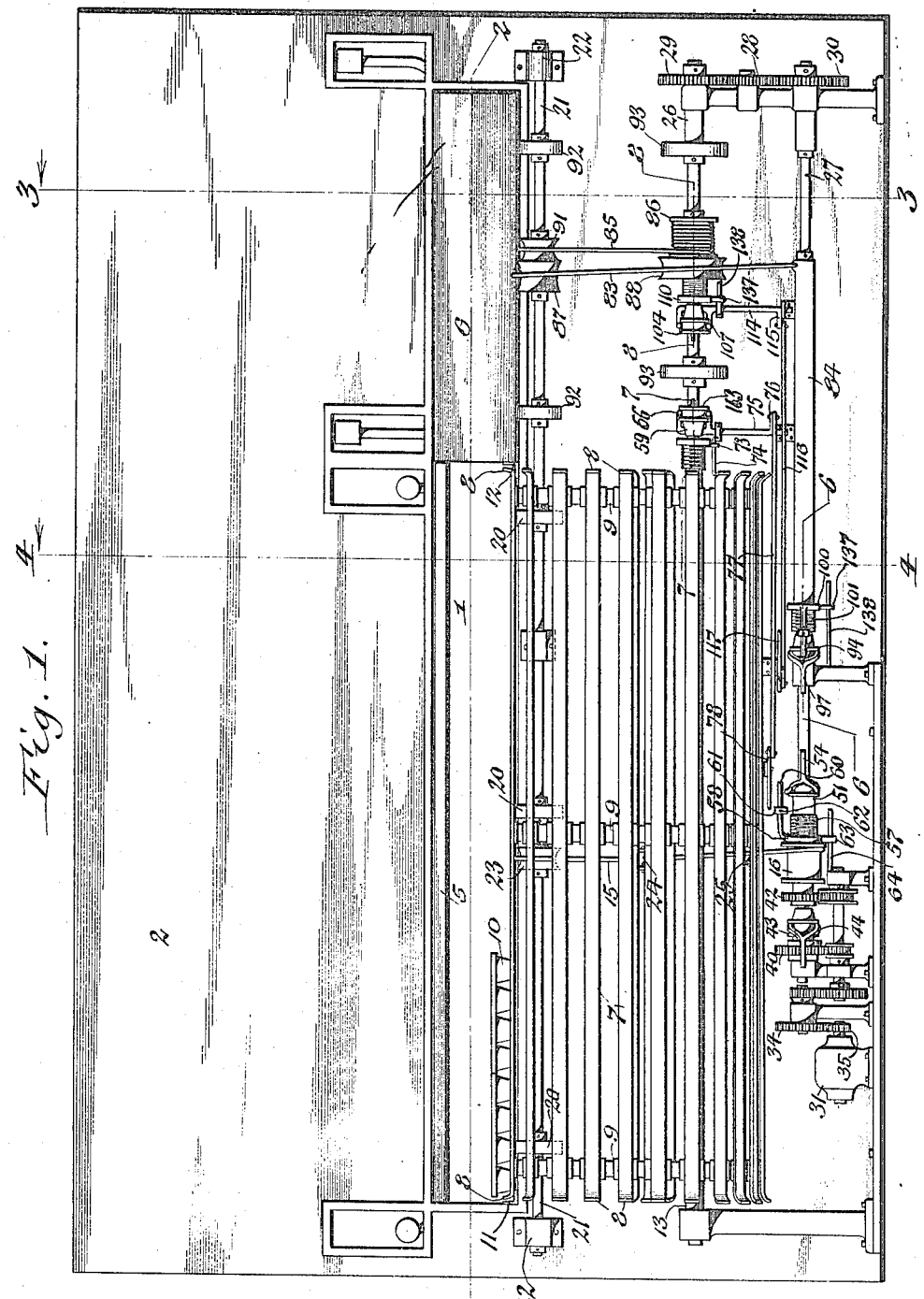

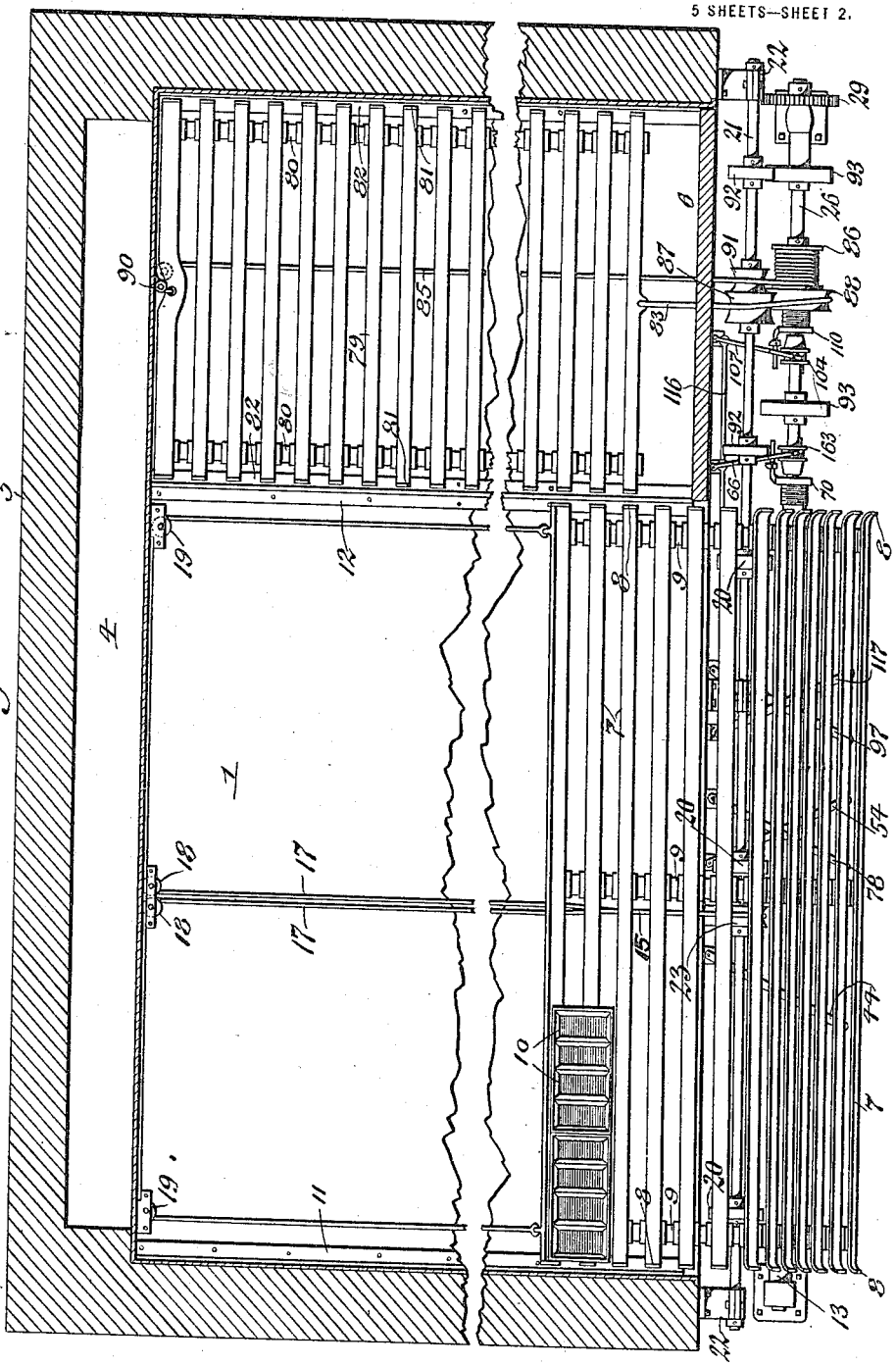

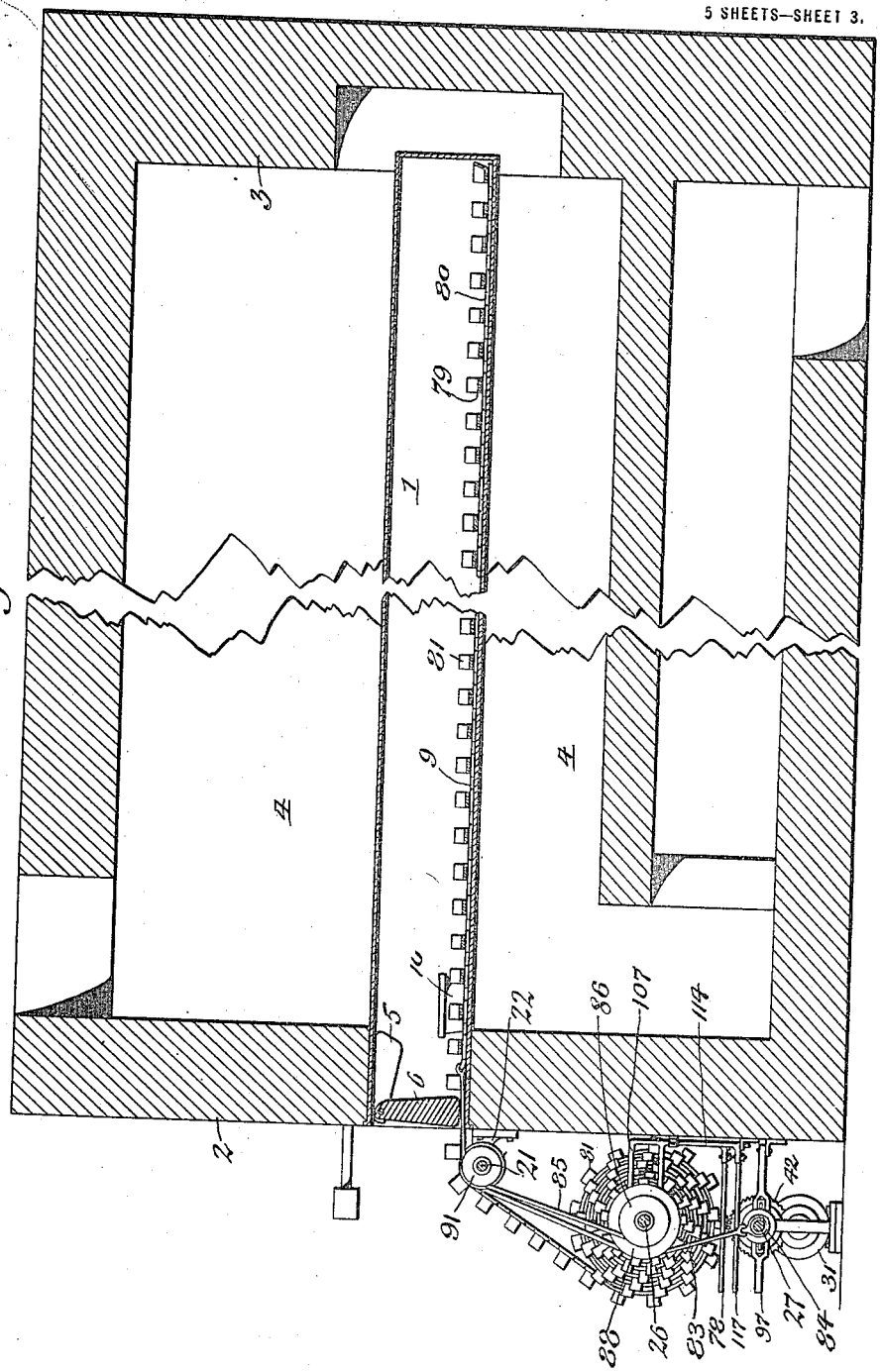

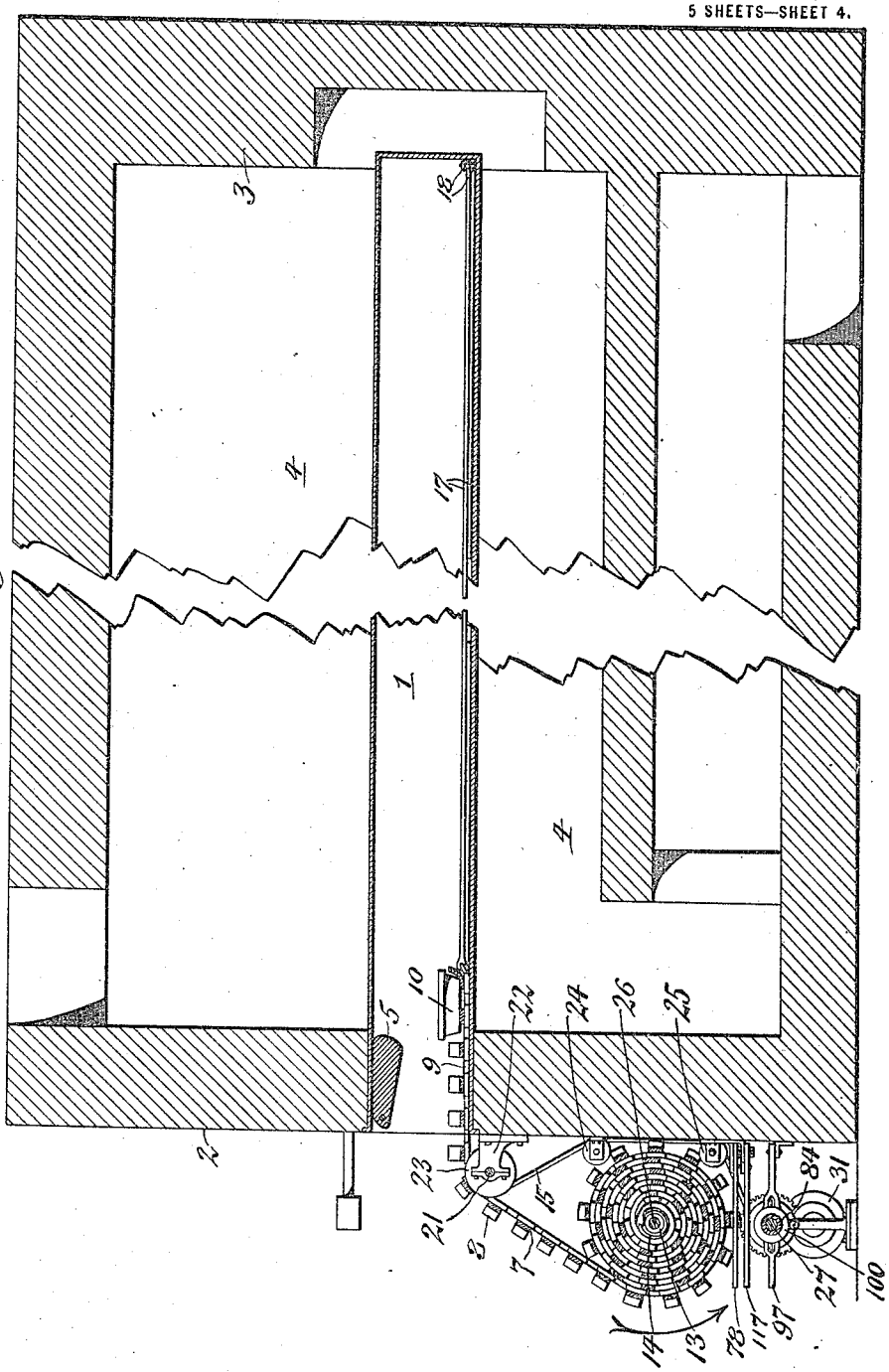

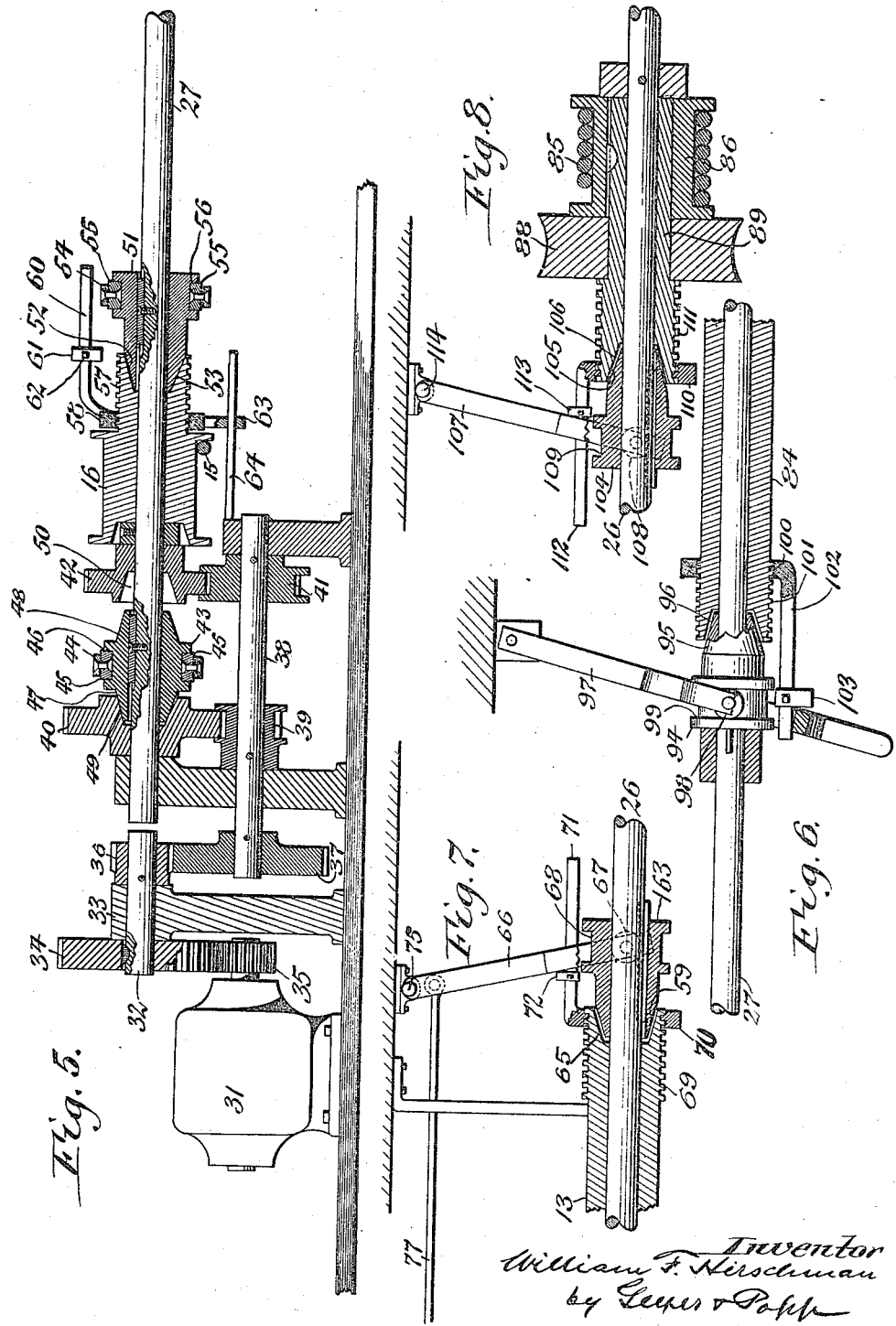

UNITED STATES PATENT OFFICE.

WILLIAM F. HIRSCHMAN, OF BUFFALO, NEW YORK.

APPARATUS FOR LOADING AND UNLOADING BAKE-OVENS.

1,283,185.            Specification of Letters Patent.      Patented Oct. 29, 1918.

Application filed February 4, 1916. Serial No. 76,129.

*To all whom it may concern:*

Be it known that I, WILLIAM F. HIRSCHMAN, a citizen of the United States, residing at Buffalo, in the county of Erie and State of New York, have invented new and useful Improvements in Apparatus for Loading and Unloading Bake-Ovens, of which the following is a specification.

This invention relates to that class of bake ovens which are more particularly designed for baking bread and the like in large quantities for the trade and the object of this invention is to provide efficient means which permit of rapidly loading the loaves of bread or the like into the baking chamber or compartment and also removing the baked goods therefrom, and so designing this loading and unloading apparatus that the same can be applied to ovens without providing a large clearance space in front of the oven and without necessitating any increase in the height of the baking chamber.

In the accompanying drawings: Figure 1 is a front elevation of a bake oven equipped with my improved loading and unloading mechanism. Fig. 2 is a horizontal section of the same taken in line 2—2, Fig. 1. Figs. 3 and 4 are vertical longitudinal sections taken on the correspondingly numbered lines in Fig. 1. Fig. 5 is a vertical section, on an enlarged scale, of a part of the driving mechanism for operating one of the load carriers of the oven. Fig. 6 is a horizontal section, on an enlarged scale, taken on line 6—6, Fig. 1 and showing part of the driving mechanism for operating the other loaf carrier of the oven. Figs. 7 and 8 are fragmentary horizontal sections, on an enlarged scale, taken on lines 7—7 and 8—8, Fig. 1, respectively.

Similar characters of reference indicate corresponding parts throughout the several views.

In Figs. 1-8, one form of my invention is applied to a bake oven having its baking chamber divided into a comparatively wide section and a comparatively narrow section, the wide section being arranged at the left hand side of the baking chamber and the narrow section at the right hand side thereof, and in this installation of my improvement the means for loading and unloading the respective sections of the baking chamber are made of correspondingly different widths. It is to be understood, however, that this invention is applicable to bake ovens regardless of the width of the baking chamber and also irrespective of the number of sections into which the same may be divided, or the width of any particular section, inasmuch as one unit of my invention of any desired width may be employed in a single oven or a plurality of such units of any desired width may be employed in a bake oven having a greater baking area.

The bake oven itself may be of any suitable and well known construction that shown in the drawings comprising a baking chamber 1 which is open at its front end or mouth but closed at its rear end, top, bottom and longitudinal sides. The setting for said baking chamber has a front wall 2, a rear wall 3, and a heating flue 4 arranged between the front and rear walls and adapted to conduct the heating medium around the external surfaces of the baking chamber so as to bake the material which is placed in the latter. The front end or mouth of the baking chamber may be opened and closed by doors, lids or shutters 5, 6 of any suitable construction, two of such shutters or doors being provided in this instance and hinged at their upper ends adjacent to the front end of the top thereof so that the same may be moved downwardly into a closed position, as shown in Fig. 3, or upwardly into an open position, as shown in Fig. 4. The left hand door is of a width corresponding to the wide section of the baking chamber and the right hand door is correspondingly smaller to fit the right hand section of the baking chamber.

In its general organization each unit of my improved loading and unloading device for bake ovens comprises a flexible carrier which is adapted to be moved from the front end toward the rear end of the baking chamber and loaded with loaves of bread or other goods to be baked as the backward or inward movement of the carrier progresses and which is also adapted to be moved outwardly or forwardly from the baking chamber to permit the attendant to remove the goods successively from the carrier after they have been baked. The construction of the flexible carrier for the wide and narrow sections of the baking oven are substantially alike, excepting as to width. The left hand or wide section of the flexible carrier, as shown in Figs. 1, 2 and 4, comprises a plurality of supporting bars or slats 7 which are arranged transversely of the baking chamber and in a longitudinal row lengthwise thereof but spaced a short distance apart, each of these slats being preferably constructed of metal and provided at its opposite ends with upturned stops or lugs 8 so as to form guards. On their undersides the several carrying slats or bars are connected by a plurality of flexible members which are preferably constructed in the form of chain belts 9 the number of such belts being varied according to the width of the carrier. In the case of the wide carrier shown in Figs. 1 and 2, three of such belts are employed two of them being connected with the carrying slats adjacent to their opposite ends while the third connects with the central parts of these slats. In this manner a flexible carrier having substantially the form of a skeleton apron is formed upon which the loaves of bread or other goods to be baked are supported while moving the same into and out of the baking chamber and also while the loaves are subjected to the baking operation of the heat which surrounds the baking chamber. These loaves may be supported upon the flexible carrier in any suitable manner but preferably by placing the same in pans 10 which are connected by suitable frames so as to form gangs or sets of these pans whereby the loading and unloading of the oven is expedited. Only two of such sets of pans are represented on the wide flexible carrier at the left hand side of Figs. 1 and 2 but it is to be understood that the remaining surface of this carrier may be loaded with like sets or gangs of pans or other suitable means for supporting the loaves thereon.

In its movement into and out of the baking chamber this flexible carrier runs with the opposite ends of its slats on two horizontal longitudinal tracks or rails 11, 12 which may be of any suitable construction but which are preferably constructed of angle iron, the lower flange of which is secured to the bottom of the baking chamber and forms the running surface over which the underside of the carrying slats ride while the upright flanges of these angle irons are arranged adjacent to the outer sides of the upturned guard lugs of the slats and thereby confine this carrier against lateral displacement.

The length of the flexible carrier is equal to the length of the operative or effective portion of the baking chamber, so that when the rear or inner end of the carrier reaches the rear or inner end of the baking chamber the same is completely loaded and wholly within the baking chamber and permits of closing the lid or door at the front end of the baking chamber preparatory to baking the batch of loaves on the carrier. As the flexible carrier moves into and out of the baking chamber the same winds off and on an unloading drum 13 which is preferably arranged horizontally and transversely in front of the oven setting below the mouth of the baking chamber. The front end of this flexible carrier is connected with the drum 13 by means of a flexible unloading line or member 14. While this flexible carrier is wholly within the baking chamber the unloading line 14 extends from the mouth of this chamber to the drum 13. When the baking of a batch of loaves has been completed the drum 13 is turned in the direction of the arrow, Fig. 4, preferably by power, and during the first portion of this turning movement the unloading line 14 is first wound upon the drum 13 and then successive portions of the flexible carrier are also wound one upon the other on this drum as the unloading of the loaves of bread from the carrier progresses. When the rear or innermost end of this carrier has reached the mouth of the baking oven the unloading of the chamber has been completed. The inward movement of the flexible carrier and the gradual unwinding of the same as the carrier is loaded with loaves may be effected by various means those shown in Figs. 1, 2 and 4 with reference to the wide carrier comprising an unloading line having a main section line 15 arranged lengthwise between the central part of the baking chamber bottom and the underside of the flexible carrier and connected at its outer or front end with a loading drum 16 arranged below the unloading drum 13, and two branch sections 17 connected at their front ends with the rear end of the main loading line while their rear ends are connected with opposite ends of the innermost supporting slat or bar of the flexible carrier. Each of the branch pulling lines passes around a pair of guide pulleys 18, 19 which are arranged respectively at the central part of the rear end of the baking chamber and adjacent to the rear end of the companion longitudinal guide rail upon which the adjacent end of the flexible carrier slides, thereby causing the branch loading lines to produce a straight inward or rearward pull upon the flexible carrier while the main line and front ends of the branch lines are moved forwardly and outwardly with the straight pull.

As the flexible carrier moves from the unloading drum 13 into the baking chamber and from the latter back to said drum this carrier is guided in making the turn at the mouth of the chamber by means which preferably comprise a plurality of guide rollers 20 which are engaged by the underside of the carrier slats and are mounted on a horizontal rod 21 which is supported transversely on the front side of the oven setting below the mouth of the baking chamber by means of brackets 22 mounted on the setting, as shown in Figs. 1, 2 and 4. The front or outer end of the main loading line is guided between the mouth of the baking chamber and the loading drum 16 by means which preferably comprise a guide roller 23 mounted on the rod 21 adjacent to the central part of the mouth of the baking chamber, and two intermediate guide pulleys or rollers 24, 25 mounted on the outer side of the front wall of the oven setting between the upper guide rollers 20 and the unloading drum 16, the guide rollers 24, 25 operating to deflect the main loading line inwardly or backwardly toward the oven setting and thereby avoid interference between this line and the flexible carrier as the same is wound up on the unloading drum 13, as shown in Fig. 4.

Various means may be provided for alternately turning the unloading drum in the direction for winding the flexible carrier thereon and unwinding the loading line from the loading drum or turning the loading drum in the opposite direction for winding the loading line thereon and causing the flexible carrier to unwind from the unloading drum. The means, however, which are shown for this purpose in the drawings are preferred and are constructed as follows:

26 represents an upper driving shaft upon the left hand end of which the unloading drum 13 is mounted, and which is arranged horizontally and transversely in front of the oven setting below the mouth of the baking chamber. 27 is a lower driving shaft which is arranged horizontally and transversely in front of the lower part of the oven setting below the upper driving shaft and unloading drum and upon which the loading drum 16 is loosely mounted on the left hand end thereof. These two driving shafts are journaled in suitable stationary bearings and are caused to turn in unison and in the same direction by means of an intermediate gear wheel 28 mounted on a suitable fixed support and meshing on its opposite sides with gear wheels 29, 30 which are preferably secured to the corresponding ends of the upper and lower driving shafts, preferably the right hand ends thereof, as shown in Fig. 1. These shafts and these gear wheels form together a driving element and are preferably turned continuously by a motor of any suitable construction. Means are also provided whereby the unloading drum 13 may be connected with or disconnected from the upper driving shaft and the loading drum may also be connected with or disconnected from the lower driving shaft depending upon whether the baking chamber is to be loaded or unloaded. As shown in the drawings, an electric motor 31 is preferably employed as the prime mover but it is to be understood that any other suitable form of motive power may be employed for this purpose. In order to permit of varying the speed with which the flexible carrier is operated while loading or unloading the oven a speed changing gearing is interposed between this prime mover and the driving element which gearing is preferably interposed between the left hand end of the lower driving shaft and this motor and is so designed that the flexible carrier can be either operated at high or low speed. In its preferred form the speed changing mechanism which is best shown in Figs. 1 and 5 is constructed as follows:

32 represents an intermediate shaft which is mounted in suitable bearings 33 in line with the lower driving shaft and provided at one end with a gear wheel 34 which meshes with a gear pinion 35 on the shaft of the electric motor while its opposite end is provided with a gear pinion 36 which meshes with a gear wheel 37 on a countershaft 38 also journaled in suitable bearings. This last mentioned shaft has secured thereto a gear pinion 39 which meshes with a gear wheel 40 mounted loosely on the lower driving shaft and is also provided with a gear wheel 41 which is of larger diameter than the pinion 39 and meshes with a gear wheel 42 also mounted loosely on the lower driving shaft. Accordingly the gear wheel 40 will be regarded as the low speed gear and the gear wheel 42 as the high speed gear wheel inasmuch as the flexible carrier will be operated at a low or high rate of speed depending upon whether said low gear wheel or the higher gear wheel is in operation.

Between the low and high speed gear wheels is arranged a clutch sleeve 43 which is splined on the adjacent part of the lower driving shaft so as to be compelled to turn therewith but is free to slide lengthwise thereof, the longitudinal movement of this clutch drive being effected by a lever 44 which is pivoted at one end on an adjacent stationary support and provided with shifting rollers 45 which are seated in an annular groove 46 formed in the periphery of the clutch sleeve. At opposite ends of the latter the same is provided with clutch cones 47, 48 which are adapted to engage with correspondingly shaped clutch sockets 49, 50 in the opposing sides of the hub portions of the low and high speed gear wheels 40, 42. When the clutch sleeve 43 is in its central position its clutch cones are out of engagement from both of the clutch sockets in which position both the low and high speed gear wheels are free on the lower driving shaft and the motor rotates idly. Upon shifting the clutch sleeve toward the left so as to engage the left hand clutch cone with the conical clutch socket of the low speed gear wheel 40 then the latter will be coupled with the lower driving shaft and the motion of the electric motor will be transmitted at a relatively low speed to the lower driving shaft and the parts associated therewith. Upon shifting the clutch sleeve 43 toward the right so as to engage the right hand clutch cone thereof with the conical clutch socket of the high speed gear wheel 42 then the latter will be coupled with the lower driving shaft and the motion of the electric motor will be transmitted faster to the lower driving shaft so that the latter and the parts associated therewith will be operated at a relatively higher speed.

Any suitable form of clutch may be employed for connecting and disconnecting the loading drum 16 with the lower driving shaft and connecting and disconnecting the unloading drum with the upper driving shaft. The clutch, however, which is shown in Figs. 1 and 5 for coupling and uncoupling the loading drum with the load driving shaft is typical of one form which is suitable for this purpose and this is constructed as follows:

51 represents a clutch sleeve which is splined on the lower driving shaft so as to be compelled to turn therewith but capable of sliding lengthwise thereof and provided at one end with a clutch cone 52 which is adapted to move into and out of engagement with a conical clutch socket 53 in the adjacent end of the loading drum 16. The longitudinal movement of this clutch sleeve is effected by means of a lever 54 pivoted on an adjacent stationary part and provided with shifting rollers 55 which are seated in an annular groove 56 in the periphery of the clutch sleeve 51. As shown in Fig. 5 the clutch sleeve 51 is shifted toward the right so that its cone is withdrawn from the conical socket of the loading drum in which position of the parts this drum is free on the lower driving shaft and the loading line thereof is free to be unwound therefrom. When, however, the clutch sleeve 51 is pushed toward the left and its cone is engaged with the conical socket of the loading drum 16 then the latter is coupled with the lower driving shaft and compelled to turn therewith, thereby causing the loading line to be wound on this drum and the movable carrier to be pulled into the baking chamber. While the loading drum 16 is thus turned by power the unloading drum 13 is free on its shaft so that it may be turned in the opposite direction and the flexible carrier and unloading line may be unwound from its drum as this carrier together with the loaves thereon is moved into the baking chamber.

In order to avoid the necessity of watching the movement of the carrier and uncoupling the loading clutch 52, 53 so as to arrest the pulling operation of the loading drum when the carrier has been moved fully into the baking oven means are provided whereby the loading clutch is automatically thrown out of operation when the carrier has fully entered the baking chamber. The preferred means for this purpose which are shown in Figs. 1 and 5 comprise a screw thread 57 arranged externally on one end of the hub of the loading drum 16, an internally threaded shipper member or ring 58 engaging with the external thread 57, a shipper rod 60 connected with the shipper ring and arranged parallel with the axis of the lower driving shaft, and a tappet 61 adjustably secured by means of a set screw 62 to the shipper rod and adapted to engage with the shifting lever. The shipper ring is held against turning but free to move lengthwise on the threaded portion of the loading drum by means of a guide eye 63 projecting downwardly from the shipper ring and engaging with a longitudinal guide rod 64 arranged on the adjacent stationary part of the machine. When the loading drum is turned backward to its fullest extent the shipper ring is moved farthest from the shifting lever at which time the latter may be moved manually toward the shipper ring for causing the clutch cone 52 to engage the clutch socket 53 and couple the loading drum with the lower driving shaft. During the subsequent forward rotation of the loading drum 16 with the lower driving shaft the shipper ring 58 is gradually moved toward the shifting lever by reason of the screw connection between this ring and the hub of the loading drum and when the latter has made a sufficient number of rotations to wind the required length of loading line thereon to bring the pan carrier fully into the baking chamber then the tappet 61 moving with the shipper ring will engage the shifting lever 54 and move the same lengthwise away from the loading drum and cause the respective clutch to be uncoupled, thereby automatically arresting the further rotation of the loading drum with the driving shaft and stopping the inward movement of the pan carrier. By making the tappet adjustable on the shifting rod the parts may be accurately adjusted relatively to each other to arrest the inward movement of the pan carrier at the proper time. While the clutch 52, 53 is thus uncoupled and the loading drum is again turned backwardly due to the withdrawal of the pan carrier from the baking chamber the shipper ring is also moved inwardly or backwardly on the hub of the loading drum preparatory to being again advanced during the subsequent forward movement of this drum for automatically disconnecting the same from the lower driving shaft.

A clutch is employed for connecting and disconnecting the unloading drum 13 and the upper driving shaft which is constructed substantially like the clutch whereby the loading drum 16 and the lower driving shaft are connected and disconnected and the description with reference to the operation and construction of the clutch associated with the loading drum 16 will therefore apply to the details of construction of the unloading drum 13. This last mentioned clutch is best shown in Figs. 1, 2 and 7 and is constructed as follows:

163 represents a clutch sleeve which is splined on the upper driving shaft 26 so as to be capable of moving lengthwise thereon but compelled to turn therewith and provided at one end with a clutch cone 59 which is adapted to engage with a conical clutch socket 65 in the adjacent end of the unloading drum 13. This clutch sleeve is moved lengthwise by means of a shifting lever 66 pivoted on an adjacent stationary part and provided with shifting rollers 67 which engage with the circumferential groove 68 formed in the periphery of the clutch sleeve 163. On the adjacent end of the unloading drum 13 the same is provided with an external screw thread 69 which receives an internally threaded shipper ring 70 having a longitudinal shipper bar 71 which has a tappet 72 adjustably secured thereto. This tappet is adapted to engage with the shifting lever 66 and automatically throw the same so as to move the clutch cone 59 out of engagement from the clutch socket 65 and arrest the outward or forward movement of the flexible carrier when the same has been withdrawn from the bake oven.

Turning of the shipper ring 70 is prevented by means of a guide eye 73 thereon engaging with a stationary longitudinal guide rod 74 mounted on an adjacent part of the machine. The shifting lever 66 is mounted on the upper end of an upright rock shaft 75 which latter has a rock arm 76 connected by a rod 77 with a hand lever 78 adjacent to the motor, as shown in Fig. 1.

In the operation of the foregoing mechanism it is only necessary for the operator to couple the clutch of the loading drum 16 by hand and then place the pans containing the loaves to be baked successively on the flexible carrier as the same enters the baking chamber and when the latter has fully entered the same the loading drum is automatically uncoupled from its driving shaft. After the baking of the batch of loaves has been completed the operator shifts the clutch of the unloading drum 13 so as to connect the same with its driving shaft, whereby the flexible carrier is withdrawn from the baking chamber and permits the attendant to remove the baked loaves successively therefrom; and when the flexible carrier has been wholly withdrawn from the baking chamber then the clutch connecting the unloading drum 13 with its driving shaft is automatically uncoupled so as to arrest the further outward movement of the carrier.

This operation of loading the baking chamber with loaves and also unloading the same can therefore be effected easily and expeditiously and with a consumption of very little power. On account of that part of the flexible carrier outside of the baking chamber being wound up or disposed of compactly in front of the baking oven it is unnecessary to provide an undue amount of space for this purpose as has been necessary in some kinds of baking plants as heretofore constructed, thereby effecting a considerable economy in cost of construction. This loaf loading and unloading device is applicable to baking ovens as heretofore constructed so that no material alteration in the same is required, thereby enabling the same to be used not only in connection with newly constructed baking ovens but also permitting of applying the same to ovens already erected.

The narrow loaf loading and unloading apparatus shown at the right hand side of Figs. 1 and 2 is constructed substantially like that shown at the left hand side of these same figures and in its general organization comprises a flexible carrier composed of a plurality of supporting slats or bars 79 which are connected near their opposite ends by flexible connecting members such as chain belts 80. The ends of said slats are provided with upwardly projecting guard lugs 81 and slide inwardly and outwardly relatively to the baking chamber by means of longitudinal rails or tracks 82 which are secured to the bottom of the baking chamber. The outer or front end of the narrow flexible carrier is connected by means of an unloading line 83 with an unloading drum 84 mounted on the lower driving shaft 27, as shown in Figs. 1, 2 and 6, and adapted to be connected with and disconnected from the latter by a suitable clutch. The rear end of the narrow flexible carrier is connected by means of a loading line 85 with a loading drum 86 which is mounted on the adjacent part of the upper driving shaft 26, as shown in Figs. 1, 2 and 8, and is adapted to be connected and disconnected with the latter by a clutch. The unloading line 83 engages with a guide pulley 87 mounted loosely on the adjacent part of the supporting rod 21 which is arranged below the mouth of the baking chamber and also around a guide wheel or pulley 88 which is mounted on the hub 89 of the loading drum 86. The loading line 85 passes from the rear or inner end of the narrow flexible carrier rearwardly or inwardly around a guide pulley 90 mounted on the rear part of the baking chamber, thence forwardly and downwardly around a guide pulley 91 mounted on the adjacent part of the supporting rod 21 and thence to the loading drum 86. Upon connecting the unloading drum 84 with the lower driving shaft the unloading line 83 is first wound upon this drum and then the outer or front portion of the narrow flexible carrier is also wound upon this drum to such an extent until the rear end of the narrow carrier has reached the mouth of the baking chamber where the same is accessible to the attendant for loading and unloading purposes. While the unloading drum 84 is connected with the lower driving shaft 27 the loading drum 86 is disconnected from the upper driving shaft 26 so as to permit the loading line 86 to unwind freely from the loading drum 86 and turn the latter backwardly on its shaft which carries the same. Upon subsequently connecting the loading drum 86 with the upper driving shaft and disconnecting the unloading drum 84 from the lower driving shaft the loading drum will be turned forwardly with the upper driving shaft and cause the loading line 85 to be wound thereon and the flexible carrier to be moved rearwardly into the baking chamber and at the same time the unloading line 83 is unwound from the unloading drum 84 and the latter is turned backwardly independently of the lower driving shaft. During the movement of the narrow carrier from the mouth of the narrow section of the baking chamber to the unloading drum the front or outer portion of this carrier is guided upon rollers 92 loosely mounted on the upper supporting rod 21 and rollers 93 mounted loosely on the upper driving shaft 26 so that this carrier will not interfere with the loading drum 86 and other mechanism mounted on this part of the upper driving shaft.

The clutch which connects the unloading drum 84 with the lower driving shaft and the clutch which connects and disconnects the loading drum 86 with the upper driving shaft are both preferably though not necessarily constructed like the clutches which connect and disconnect the loading and unloading drums 16, 13 with their respective shafts and are also preferably combined with means whereby when the narrow carrier reaches either the outer or the inner end of its proper travel that the respective operative drum will be automatically disconnected from its driving shaft. The clutch for connecting and disconnecting the unloading drum 84 with the lower driving shaft is best shown in Figs. 1 and 6 and comprises a clutch sleeve 94 splined on the lower driving shaft so as to be compelled to turn therewith but free to move longitudinally thereon for the purpose of engaging a clutch cone 95 at one end thereof with or disengaging the same from a clutch socket 96 on the adjacent end of the unloading drum 84, a shifting lever 97 pivoted on a stationary part and provided with rollers 98 engaging with an annular groove 99 in the clutch sleeve, and an internally screw threaded shipper ring 100 engaging with an external screw thread 101 on the unloading drum 84 and provided with a shipper rod 102 having a tappet 103 adjustably secured thereto which tappet is adapted to engage with the shifting lever 97 for automatically uncoupling the clutch cone 95 and clutch socket 96.

A clutch mechanism of substantially the same construction is shown in Figs. 1, 2 and 8 for connecting and disconnecting the loading drum 86 with the upper driving shaft and as there shown this clutch comprises a clutch sleeve 104 splined on the upper driving shaft so as to be compelled to turn therewith but movable lengthwise thereon for the purpose of engaging a clutch cone 105 on this sleeve with or disengaging the same from a clutch socket 106 on the adjacent end of the hub of the loading drum 86, a shifting lever 107 pivoted on an adjacent stationary part and provided with shifting rollers 108 engaging in an annular groove 109 in the clutch sleeve 104, an internally screw threaded shipper ring 110 engaging with an external screw thread 111 on the hub of this last mentioned drum and provided with a shipper rod 112 which has a tappet 113 adjustably mounted thereon for engagement with the shifting lever 107 for moving the latter in the direction for uncoupling the clutch cone 105 and socket 106. The shifting lever 107 is mounted on the upper end of a rock shaft 114 which latter has a lower arm 115 connected by a link 116 with a hand lever 117 adjacent to the motor. By this means the levers 44, 54, 78, 97, 117 are all arranged close to each other and adjacent to the motor and the speed changing gear so that they are within convenient reach of the operator and enables him to readily control the operation of the loading and unloading devices of the baking chamber in accordance with the requirements of the work. The shipper rings 100 and 110 may be held against turning by any suitable means, for instance, by means of guide eyes 137 arranged on these rings and sliding on stationary guide rods 138, as shown in Fig. 1.

Instead of moving the front or outer portion of the flexible carrier through the mouth of the baking chamber for the purpose of loading the loaves into the chamber and unloading the loaves from the same, as is done in the construction shown in Figs. 1-4, similar results may be obtained by the modified construction shown in Figs. 9 and 10 in which the flexible carrier is always retained wholly within the baking chamber. In this construction the flexible carrier comprises a plurality of transverse supporting bars or slats 118 which are arranged transversely within the baking chamber 119 and adapted to ride at their opposite ends on horizontal longitudinal tracks 120 which are secured to the longitudinal side walls of this chamber at a distance from the bottom thereof and parts of two endless longitudinal flexible members 121 which preferably consist of chain belts which are connected with the supporting bars on their undersides adjacent to opposite ends thereof, said bars being provided with upwardly turned ends 122 forming guard lugs which confine the gangs of pans against lateral displacement on the carrier. At its front and rear ends the baking chamber is provided with supporting wheels 123, 124 which are preferably constructed in the form of sprocket wheels, the sprocket wheels 124 at the rear or inner end of the baking chamber being mounted on a transverse shaft 126 which is mounted in any suitable manner, and the sprocket wheels 123 at the front or outer end of the baking chamber being mounted on a horizontal transverse shaft 127 which is also journaled in suitable bearings on the adjacent part of the oven setting. The flexible connections or chains of the carrier pass at their front and rear turns around the sprocket wheels 123, 124, at the front and rear ends of the baking chamber. During the operation of loading the baking chamber the slat bearing parts of the endless chain belts pass from the lower stretch thereof upwardly and rearwardly to the upper stretch thereof until the innermost slat reaches the rear end of the baking chamber at which time the foremost slat is arranged at the front end of the baking chamber on the upper stretch of the belts and the loading of the oven is completed. For the purpose of unloading the chamber after the baking operation has been finished the endless belts are moved in the opposite direction so that successive supporting slats pass from the upper stretches of the belts downwardly and rearwardly to the lower stretches thereof until the rearmost supporting slat reaches the mouth of the baking chamber when the loading operation is completed.

This movement of the endless belts may be produced in a variety of ways, for instance, as shown in the drawings this may be accomplished by means of a counter shaft 128 provided with a pinion 129 engaging with a gear wheel 130 on the front shaft 127 and two loose pulleys 131, 132 and a tight pulley 133 arranged on the shaft 128 and adapted to receive straight and twisted driving belts for the purpose of causing the loaf carrier to move either inwardly or outwardly relatively to the baking oven. If desired the slats while on the lower stretches of the belts 121 may run on tracks 134 secured to the bottom of the baking chamber 119.

It is to be understood that when a batch of dough loaves has been moved into the baking chamber by the flexible carrier the latter remains at rest in the same until the baking of the loaves has been completed and then the movement of the carrier is reversed and backed out of the baking chamber with the load of baked goods.

I claim as my invention:

1. The combination of a baking oven having an opening on one end only, and means for moving the loaves into and out of said oven, said means comprising a flexible carrier having a single stretch which is guided within said opening and passes through said opening, and a rotatable drum arranged outside of the oven immediately below the opening thereof and constructed to permit of winding practically the entire carrier thereon.

2. The combination of a baking oven having an opening on one end only, and means for moving the loaves into and out of said oven, said means comprising a flexible carrier having a single stretch which is guided within said oven and passes through said opening, a rotatable drum arranged outside of the oven immediately below the opening thereof and constructed to permit of winding practically the entire carrier thereon, a power shaft on which said drum is mounted, and means for manually connecting and automatically disconnecting said shaft and drum.

3. The combination of a baking chamber, and means for loading loaves to be baked into said chamber and unloading the same therefrom comprising a flexible carrier movable into and out of its operative position in said chamber and adapted to support said loaves, a drum arranged outside of said chamber immediately adjacent to the outlet thereof, and an unloading line connecting said carrier with said drum, said carrier and line being adapted to wind on said drum.

4. The combination of a baking chamber, and means for loading loaves to be baked into said chamber and unloading the same therefrom comprising a flexible carrier adapted to support said loaves and movable lengthwise through the mouth of said chamber, loading and unloading drums arranged in front of said chamber, a loading line connecting the inner end of said carrier with said loading drum, an unloading line connecting the outer end of said carrier with said unloading drum, a rotary driving element on different parts of which said drums are mounted, and means for connecting each of said drums with and disconnecting the same from said driving element.

5. The combination of a baking chamber, and means for loading loaves to be baked into said chamber and unloading the same therefrom comprising a flexible carrier adapted to support said loaves and movable lengthwise through the mouth of said chamber, loading and unloading drums arranged in front of said chamber, a loading line connecting the inner end of said carrier with said loading drum, an unloading line connecting the outer end of said carrier with said unloading drum, a rotary driving element including two shafts on which said drums are mounted, respectively, and clutches for connecting and disconnecting each drum and its companion shaft.

6. The combination of a baking chamber, and means for loading loaves to be baked into said chamber and unloading the same therefrom comprising a flexible carrier adapted to support said loaves and movable lengthwise through the mouth of said chamber, loading and unloading drums arranged in front of said chamber, a loading line connecting the inner end of said carrier with said loading drum, an unloading line connecting the outer end of said carrier with said unloading drum, a rotary driving element including two shafts on which said drums are mounted, respectively, clutches for connecting and disconnecting each drum and its companion shaft and means for coupling each of said clutches manually at will and uncoupling the same automatically at a predetermined time.

7. The combination of a baking chamber, and means for loading loaves to be baked into said chamber and unloading the same therefrom comprising a flexible carrier adapted to support said loaves and movable lengthwise through the mouth of said chamber, loading and unloading drums arranged in front of said chamber, a loading line connecting the inner end of said carrier with said loading drum, an unloading line connecting the outer end of said carrier with said unloading drum, a rotary driving element comprising an upper driving shaft on which said loading drum is mounted, a lower driving shaft on which said unloading drum is mounted, and gearing interposed between said shafts for causing the same to turn together, and clutches for connecting and disconnecting each of said drums with its companion driving shaft.

WILLIAM F. HIRSCHMAN.

Copies of this patent may be obtained for five cents each, by addressing the "Commissioner of Patents, Washington, D. C."